Patented May 18, 1954

2,678,893

UNITED STATES PATENT OFFICE 2,678,893

METHOD FOR RENDERING LEATHER WATER REPELLENT

Toivo A. Kauppi, Midland, Mich., assignor to Dow Corning Corporation, Midland, Mich., a corporation of Michigan No Drawing. Application February 21, 1951, Serial No. 212,200

4 Claims. (Cl. 117—135.5)

This invention relates to leather containing a siloxane.

There has long been a need for a material which when incorporated in leather would render the material water repellent without clogging the pores thereof. It is also desirable that such a material should not change the basic characteristics of the leather, such as ease of polishing, color and texture.

It is an object of this invention to produce a leather composition which is impervious in water under severe conditions. Another object is to provide a leather which may be employed in shoes and which will render them water repellent without affecting the appearance. Another object is to provide a leather composition which is not deteriorated by oil. Other objects and advantages will be apparent from the following description.

In the past, many attempts have been made to adapt siloxanes for use in leather articles. These attempts did not meet with practical success because the treated leather showed little or no improvement in such properties as for example, water repellency, over leather which had been impregnated with organic material conventionally used with leather. One of the chief deficiencies was the inability to prevent penetration of water through the leather when it was stretched and/or flexed. This fatal defect in siloxane-treated leather has been remedied by the present invention.

This invention relates to a composition of matter composed of leather containing from 0.1 to 60 per cent by weight based upon the weight of the leather of a methylsiloxane composed of trimethylsiloxane units and $SiO_2$ units in such proportions that the ratio of methyl radicals to silicon atoms is from 1 to 2.5.

The applicant has discovered that when leather is impregnated with the particular siloxanes above defined in the amounts specified, a different order of water repellency is obtained from that produced by any other known organosilicon material.

The leather is best treated by contacting it with a solution of the siloxane in a volatile solvent. The leather may be contacted either by swabbing it with the solution or by immersing it in the solution and agitating the leather. The latter method is the preferred form of treatment.

For best results, the concentration of the solutions should be from 1 to 50 per cent by weight siloxane. Optimum water repellency is obtained at a concentration of 25 per cent but other concentrations may be preferable for other optimum values such as for example, oil resistance. After impregnation is completed, the leather is removed from contact with the solution and air-dried.

Any type leather whether tanned, tawed or otherwise cured, is within the scope of the present invention. The leather may be untreated or it may contain any of the additives normally employed with leathers, such as dyes, oils, greases or fats.

The siloxanes employed herein are copolymers composed essentially of trimethylsiloxane units and unsubstituted siloxane units. They may be prepared by cohydrolysis of a silane of the formula $(CH_3)_3SiX$, where X is any hydrolyzable group, with silicon tetrahalides or silicon tetraalkoxides. The cohydrolysis is carried out in the usual manner. Alternatively, the copolymer may be prepared by reacting trimethylchlorosilane, trimethylalkoxysilanes or hexamethyldisiloxane with a silica sol under acid conditions. The latter method is more particularly set forth in the copending application of William H. Daudt and Leslie J. Tyler, Serial No. 184,720, filed September 13, 1950, and assigned to the assignee of this invention.

If desired, the above defined copolymer may be mixed with up to 50 per cent by weight, but no more, of other organosilicon materials. Materials which may be mixed with the copolymer are organosiloxanes in which the organic radicals are any monovalent hydrocarbon radical or organopolysilanes containing Si—Si linkages in which the organic radicals are any monovalent hydrocarbon radical. Specific examples of such additives are dimethylsiloxane fluids, methylphenylsiloxane resins, methylphenylsiloxane fluids, stearyl silsesquioxane, butylmethylpolysilane, phenylmethylpolysilane and stearylmethylpolysilane. Obviously, any of the above materials must be in a soluble form.

Solvents which may be employed in this invention are petroleum hydrocarbons, benzene, toluene and xylene.

One use for the present invention is in conjunction with shoes. The solution of the siloxane may be applied to the surface thereof and dried. The shoes become water repellent so that overshoes may in most cases be dispensed with. The treatment does not interfere with polishing the shoes.

The water repellency of the leather was measured in the following manner. A strip of leather was clamped between a fixed and moving arm. The leather was placed grain side up and at the maximum separation of the arms, the leather was under a five pound tension. The flexing arm in closed position was one inch from the fixed mount and moved a total distance of 2¾ inches. The unit operated at 40 cycles per minute. The movement of the unit gave a rapid flexing and stretching action to the test sample. Before the action was started, a drop of water was placed on the grain side of the leather. The test was continued until the water had penetrated to the flesh side.

By employing this method, leather which was not impregnated with the siloxane was penetrated by the water in 500 to 650 flexes.

The following examples are illustrative only and should not be construed as limiting the scope of the invention. The scope is properly set forth in the appended claims.

*Example 1*

A copolymeric siloxane composed of trimethylsiloxane units and $SiO_2$ units in such proportion that the methyl to silicon ratio was 1.93 was prepared by reacting hexamethyldisiloxane with an acid solution of a silica sol. The siloxane is dissolved in a petroleum distillate known as "Stoddard Solvent," so as to give a 10 per cent by weight solution of the siloxane. A strip of leather was immersed in the solution and agitated therein for five minutes. The strip was then removed and air-dried. It was placed on the flexing machine and a drop of water put on the grain side. It required 5,000 flexes before water seeped through the leather. By comparison, the same leather which had not been treated with the siloxane was penetrated by the water in about 550 flexes.

*Example 2*

A siloxane composed of 70 per cent of copolymeric siloxane of Example 1 and 30 per cent by weight of a dimethylsiloxane fluid was dissolved in a petroleum distillate so as to give a 25 per cent by weight solution based on the total siloxane. A piece of treated leather different from that of Example 1 was immersed in this solution and agitated for five minutes. The leather was removed and air-dried and it required 10,500 flexes before water would penetrate from the grain to the flesh side. By contrast, a sample of the same piece of leather which was not treated with siloxane was wet through at 650 flexes.

*Example 3*

The procedure of Example 1 was repeated except that the siloxane employed was 70 per cent of the siloxane in Example 1 and 30 per cent monostearylsiloxane. The resulting leather withstood 8,500 flexes before the water penetrated.

*Example 4*

The procedure of Example 1 was repeated except that the siloxane was a mixture of 70 per cent of the copolymer of Example 1 and 30 per cent of stearylmethylpolysilane. The treated leather required 3,000 flexes before it wet through.

*Example 5*

The procedure of Example 1 was repeated except that the siloxane employed was 70 per cent by weight the siloxane of Example 1 and 30 per cent by weight of a copolymeric phenylmethylsiloxane fluid. The resulting leather withstood 4,000 flexes before water penetrated.

That which is claimed is:

1. The method of rendering leather water repellent comprising contacting the leather with a solution of a methylpolysiloxane composed of trimethylsiloxane units and $SiO_2$ units in such proportion that the ratio of methyl radicals to silicon atoms is from 1 to 2.5, said solution containing from 1 to 50 per cent by weight of the methylpolysiloxane.

2. The method of rendering leather water repellent comprising contacting the leather with a mixture of siloxanes composed of 50 to 100 per cent by weight of the methylpolysiloxane of claim 1 and up to 50 per cent by weight of a benzene soluble organosilicon compound selected from the group consisting of organopolysiloxanes and organopolysilanes in both of which the organic groups are monovalent hydrocarbon radicals, the aforesaid mixture of siloxanes being employed in a solution of from 1 to 50 per cent by weight concentration of said mixture.

3. The method of claim 2 in which the organic groups of the organopolysiloxanes and organopolysilanes are selected from the group consisting of alkyl and monocyclic aryl radicals.

4. The method of rendering leather water repellent comprising contacting the leather with a solution containing from 1 to 50 per cent by weight of an organosiloxane mixture composed of 50 to 100 per cent by weight of a methylpolysiloxane composed of trimethylsiloxane units and $SiO_2$ units in such proportion that the ratio of methyl radicals to silicon atoms is from 1 to 2.5, and up to 50 per cent by weight of a dimethylpolysiloxane fluid.

References Cited in the file of this patent

UNITED STATES PATENTS

| Number | Name | Date |
|---|---|---|
| 2,412,470 | Norton | Dec. 10, 1946 |
| 2,441,098 | Hyde | May 4, 1948 |
| 2,462,640 | Hyde | Feb. 22, 1949 |
| 2,469,625 | Barry | May 10, 1949 |
| 2,494,920 | Warrick | Jan. 17, 1950 |
| 2,562,953 | Rust | Aug. 7, 1951 |
| 2,564,674 | Cheronis | Aug. 21, 1951 |
| 2,568,384 | Cheronis | Sept. 18, 1951 |